(12) United States Patent
Gerrard

(10) Patent No.: US 7,845,663 B2
(45) Date of Patent: Dec. 7, 2010

(54) ARM FOR A MOTOR VEHICLE INDEPENDENT SUSPENSION AND MOTOR VEHICLE INDEPENDENT SUSPENSION COMPRISING THE SAME

(75) Inventor: Miles Barnaby Gerrard, Copenhagen (DK)

(73) Assignee: Sistemi Sospensioni S.p.A., Milan (IT)

( * ) Notice: Subject to any disclaimer, the term of this patent is extended or adjusted under 35 U.S.C. 154(b) by 200 days.

(21) Appl. No.: 12/299,509

(22) PCT Filed: May 8, 2007

(86) PCT No.: PCT/IB2007/051727

§ 371 (c)(1),
(2), (4) Date: Nov. 4, 2008

(87) PCT Pub. No.: WO2007/129282

PCT Pub. Date: Nov. 15, 2007

(65) Prior Publication Data

US 2009/0066051 A1    Mar. 12, 2009

(30) Foreign Application Priority Data

May 9, 2006    (IT)    ............................ TO2006A0334

(51) Int. Cl.
*B60G 3/04*    (2006.01)
(52) U.S. Cl. .............................................. 280/124.134
(58) Field of Classification Search .......... 280/124.134, 280/124.135, 124.136, 124.138, 124.145, 280/86.751, 86.752, 86.754, 86.756, 86.758
See application file for complete search history.

(56) References Cited

U.S. PATENT DOCUMENTS 4,772,043 A    9/1988    Muramatsu (Continued)

FOREIGN PATENT DOCUMENTS

DE    30 47 004 A1    7/1982

(Continued)

OTHER PUBLICATIONS

U.S. Appl. No. 12/295,846, filed Oct. 2, 2008.

*Primary Examiner*—Faye M. Fleming
(74) *Attorney, Agent, or Firm*—Sughrue Mion, PLLC

(57) ABSTRACT

The arm (14) comprises a first transverse connecting element (18), articulated at its transversely outer end to a wheel-carrier (10) by means of a pair of bushes (22, 24) and at its transversely inner end to the vehicle body by means of a bush (20), a second transverse connecting element (28), articulated at its transversely outer end to the wheel-carrier (10) by means of a bush (32) and at its transversely inner end to the vehicle body by means of a bush (30), and a longitudinal interconnecting element (34) which connects the first and the second connecting element (18, 28) to each other at transversely inner portions thereof. The first and the second connecting elements (18, 28) converge towards the outside of the vehicle. The first connecting element (18) is stiff in torsion, whereas the second connecting element (28) and the interconnecting element (34) have cross-sections such that the vertical stiffness of the arm (14) at the point of articulation of the second connecting element (28) to the wheel-carrier (10) is negligible with respect to the vertical stiffness at the point of articulation of the first connecting element (18) to the wheel-carrier (10). Torques acting on the wheel-carrier (10) around a transverse axis (ESAy) are thus only reacted by the first connecting element (18).

25 Claims, 7 Drawing Sheets

U.S. PATENT DOCUMENTS 6,099,005 A    8/2000  Wakatsuki

FOREIGN PATENT DOCUMENTS

| | | |
|---|---|---|
| DE | 42 24 484 A1 | 1/1994 |
| DE | 102 29 919 A1 | 1/2004 |
| EP | 0 158 279 A2 | 10/1985 |
| EP | 0 220 851 A1 | 5/1987 |
| EP | 0 847 883 A2 | 6/1998 |
| EP | 1 125 774 A2 | 8/2001 |
| EP | 1 288 028 A2 | 3/2003 |
| EP | 1 361 083 A2 | 11/2003 |
| FR | 2 645 078 A1 | 10/1990 |
| JP | 05-330324 A | 12/1993 |
| JP | 09-290610 A | 11/1997 |
| WO | 00/64690 A1 | 11/2000 |
| WO | 2007/113761 A2 | 10/2007 |

ARM FOR A MOTOR VEHICLE INDEPENDENT SUSPENSION AND MOTOR VEHICLE INDEPENDENT SUSPENSION COMPRISING THE SAME

The present invention relates to a suspension arm for connecting a wheel-carrier to the body of a motor vehicle in an independent suspension system, as specified in the preamble of claim 1.

A suspension arm of the above-identified type is known from unpublished Italian Patent Application N. TO2006A000246 in the Applicant's name. According to this known solution, the suspension arm comprises a pair of transverse links articulated at their outer ends to the wheel-carrier of a vehicle wheel and at their inner ends to the vehicle body, and at least one pair of connecting elements which connect the links to each other and are preferably made in the shape of a blade or plate, in such a manner that they exhibit a bending stiffness in a plane which is higher than the bending stiffness in a direction perpendicular to that plane. The suspension arm is able to control two translational degrees of freedom along the axes of the links and, thanks to the geometry and to the torsional stiffness of the links, as well as to the geometry and to the bending stiffness of the connecting elements in their plane, a first rotational degree of freedom around a first axis of mainly transverse and horizontal direction. The two links converge, preferably towards the outside of the vehicle, in such a manner that the arm has a centre of stiffness located outside its own envelope and is thus able to control, thanks to the geometry and to the bending stiffness of the links, as well as to the geometry and to the bending stiffness of the connecting elements in the direction perpendicular to their plane, a second rotational degree of freedom around a second axis of mainly vertical direction.

It is an object of the present invention to provide an arm for a motorcar independent suspension which offers a higher level of decoupling of the degrees of freedom under control than in the above-discussed prior art and which therefore allows to simplify the prototype development stage of the arm aiming at meeting the elasto-kinematic requirements imposed. A further object of the present invention is to provide a suspension arm which has a smaller number of parts, a lower weight and reduced manufacturing costs than the known arrangement illustrated above.

These and other objects are fully achieved according to the present invention by virtue of a suspension arm having the characteristics specified in the characterizing part of independent claim 1.

Preferred embodiments of a suspension arm according to the invention are defined in the dependent claims.

The characteristics and the advantages of the invention will become apparent from the following detailed description, given purely by way of non-limiting example, with reference to the appended drawings, in which.

Figure 1:
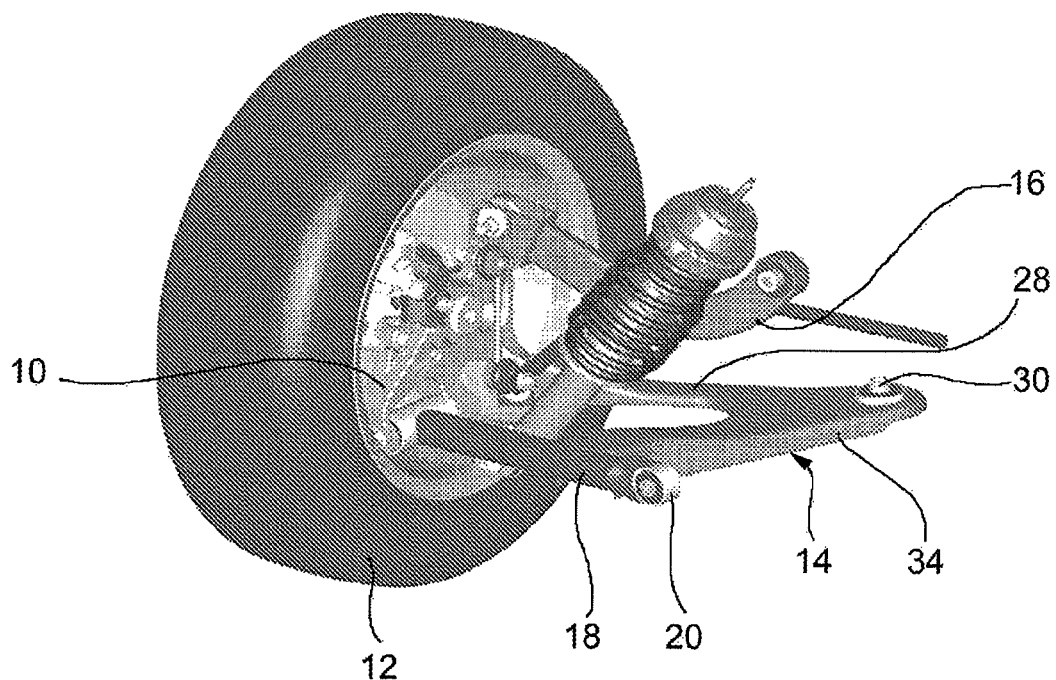
FIG. 1 is a perspective view of a motor vehicle independent suspension according to a preferred embodiment of the present invention.
Figure 3:
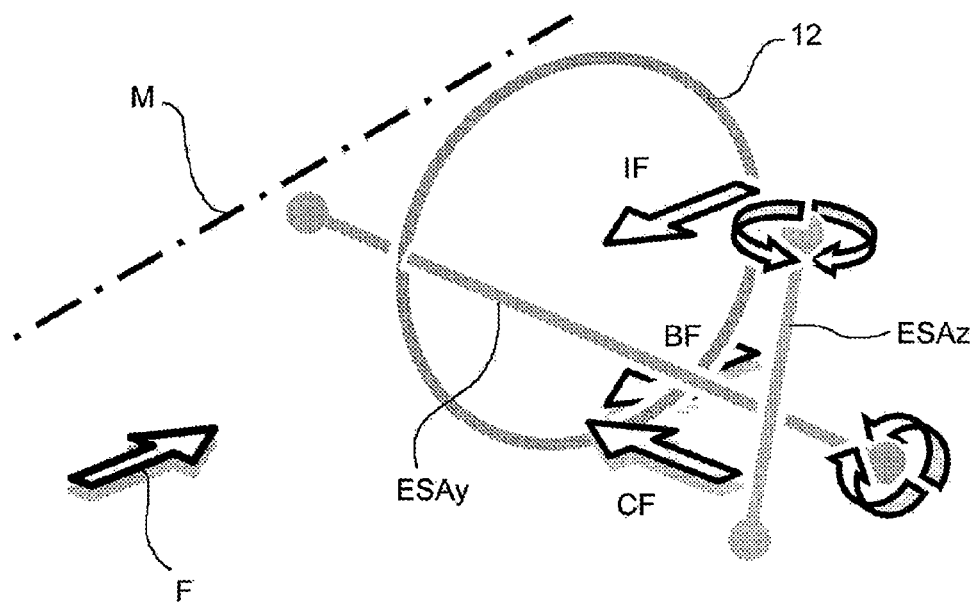
Figure 4:
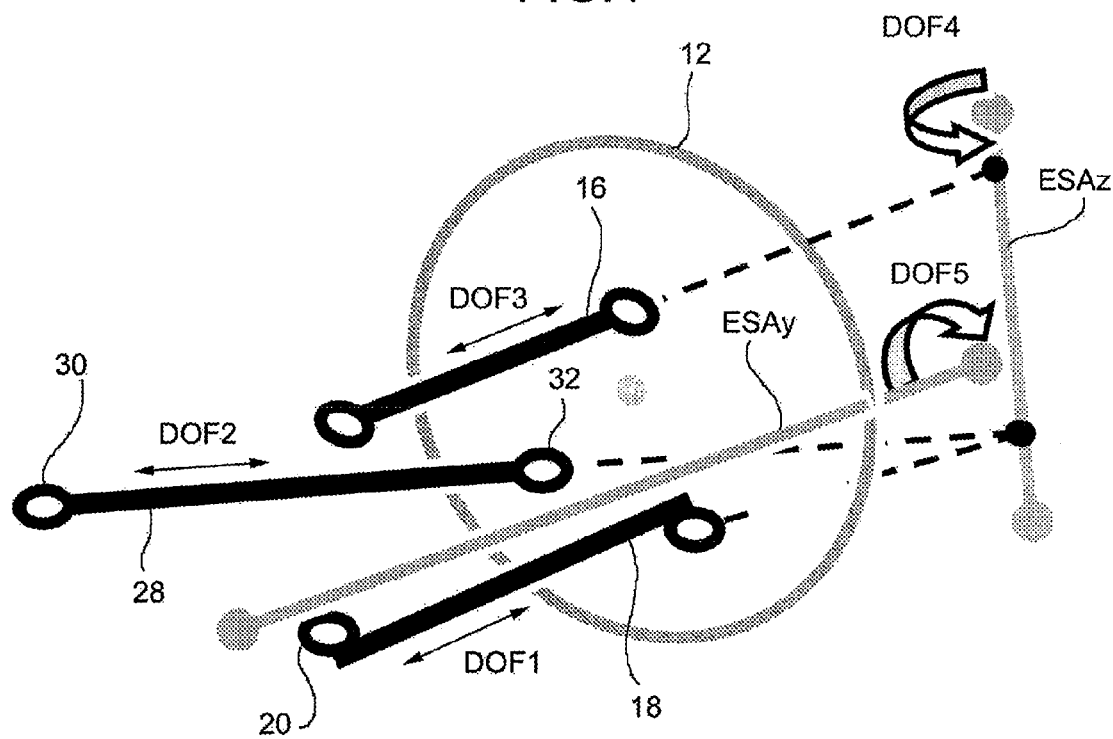
Figure 5:
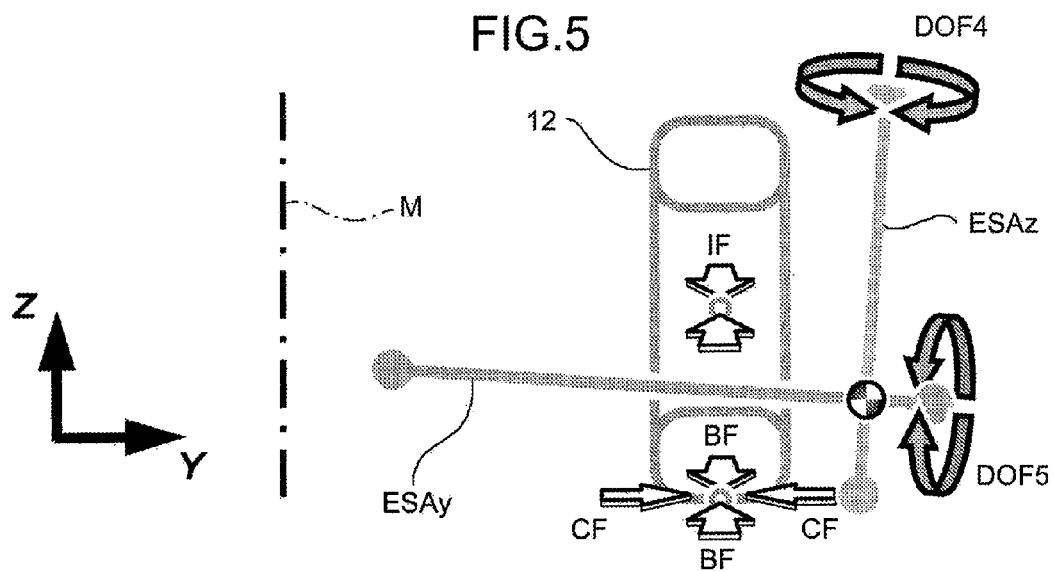
Figure 6:
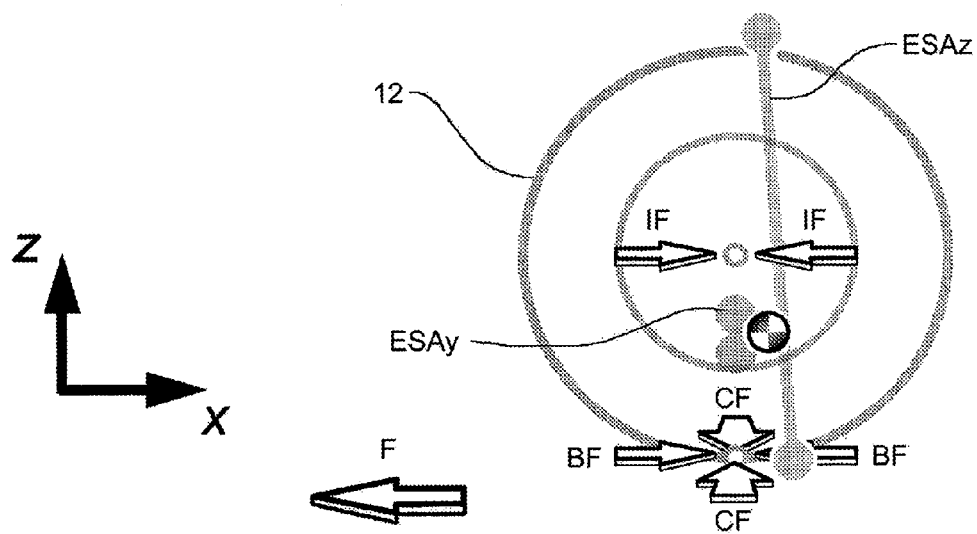
Figure 7:
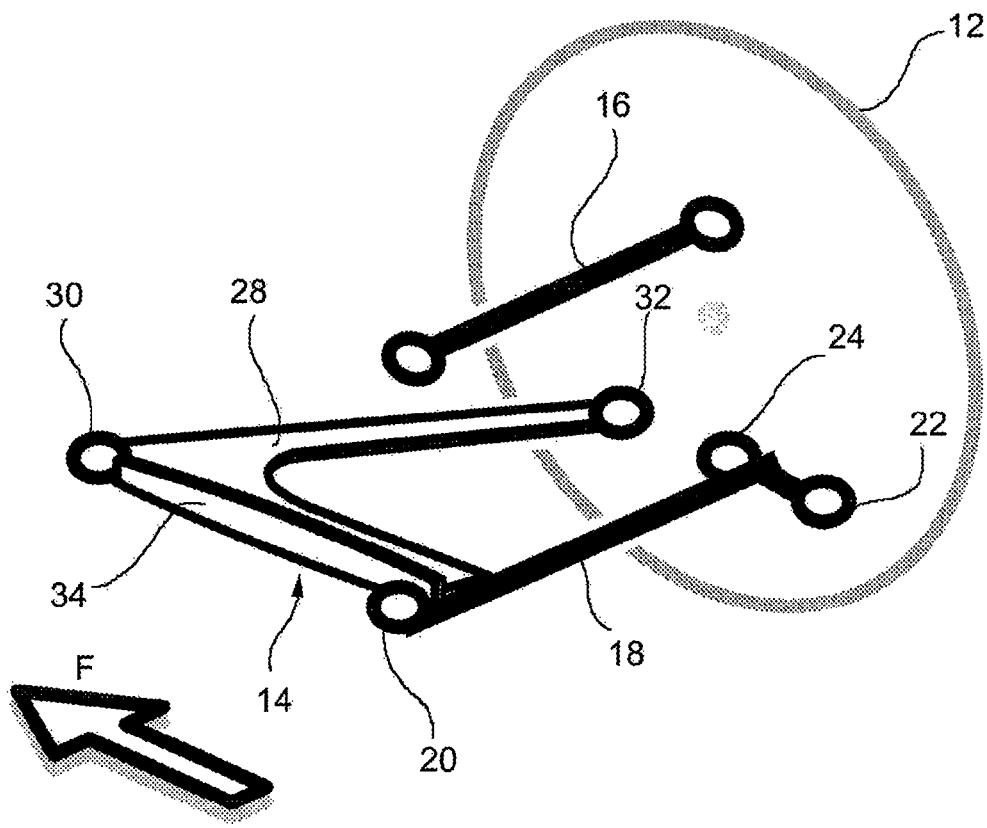
Figure 8:
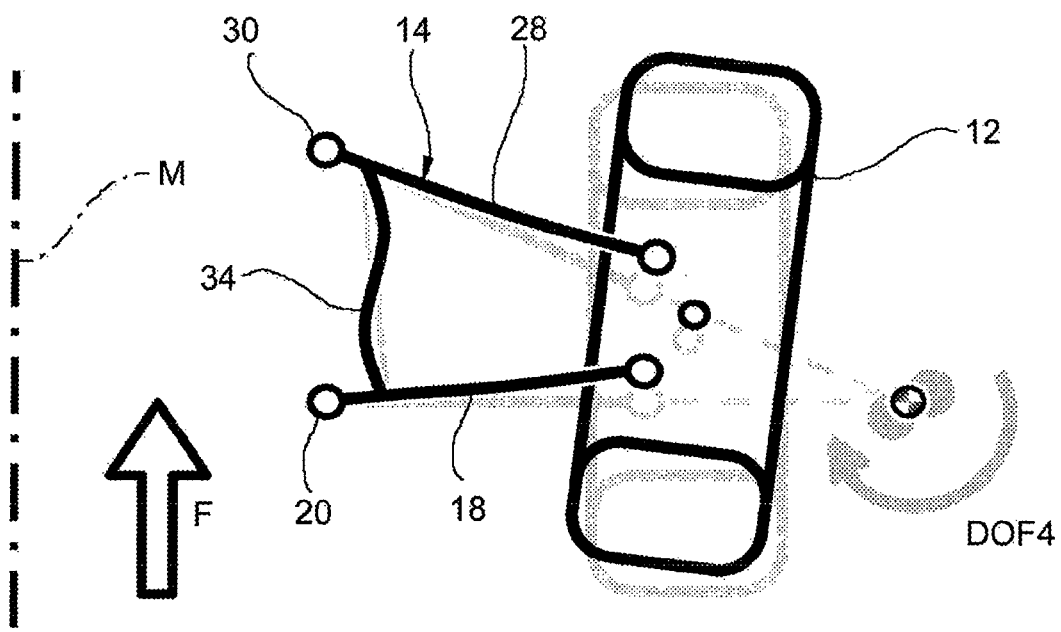
Figure 9:
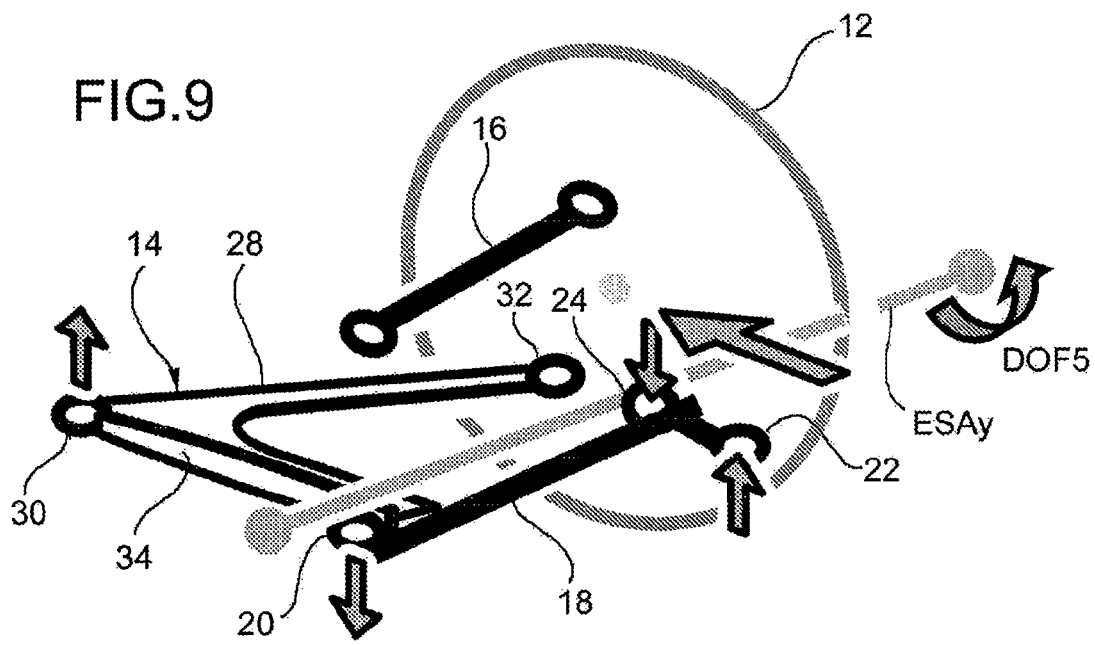
Figure 10:
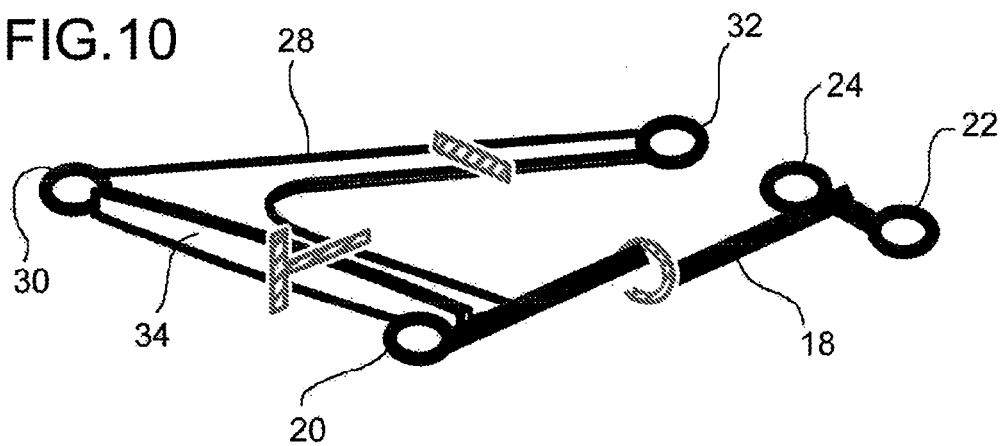
Figure 11:
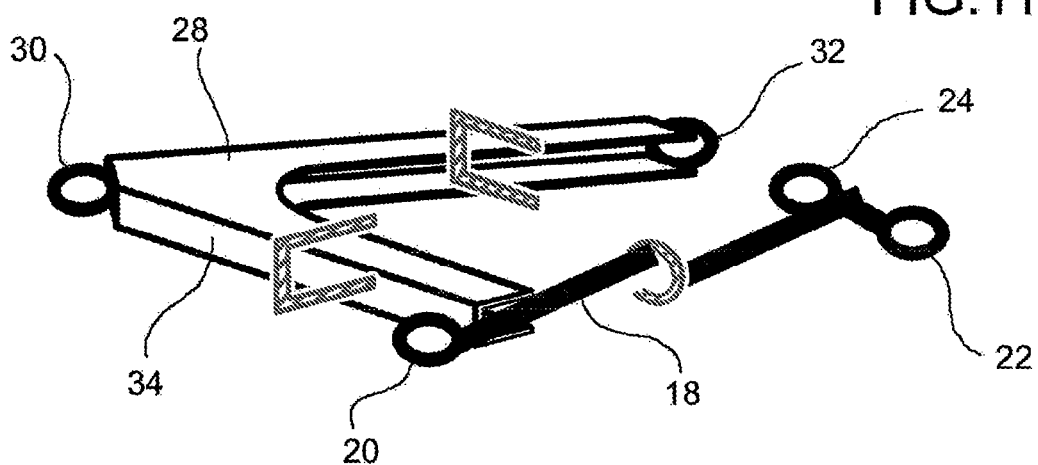
Figure 12:
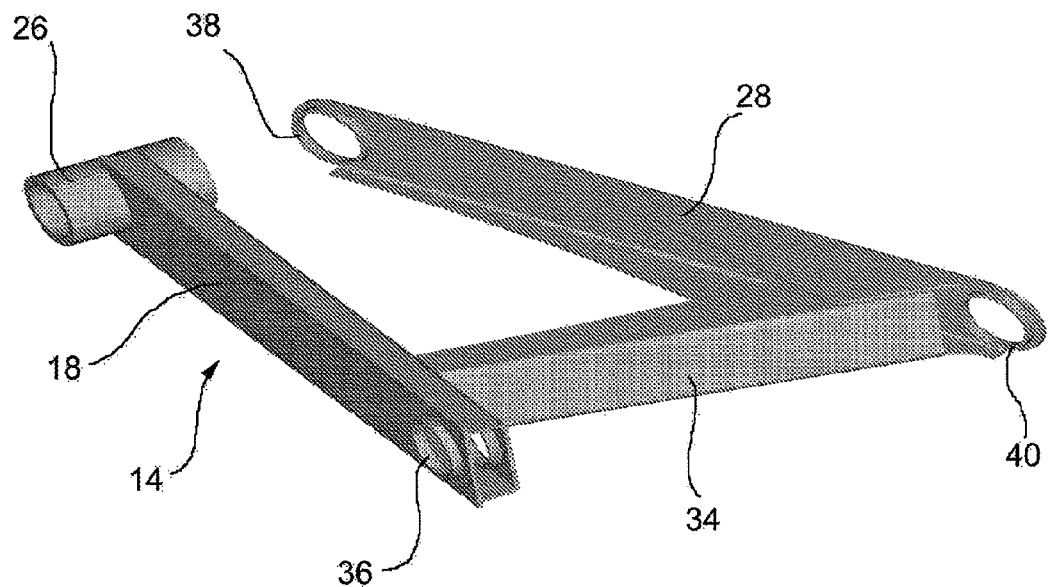
Figure 13:
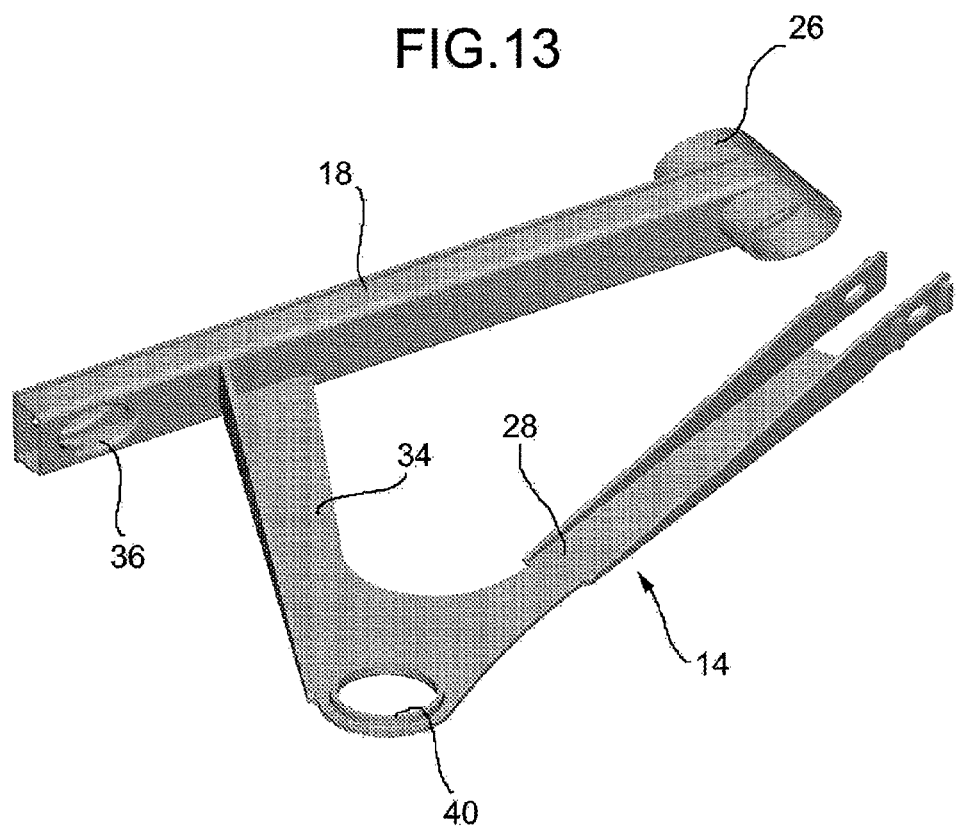
Figure 14:
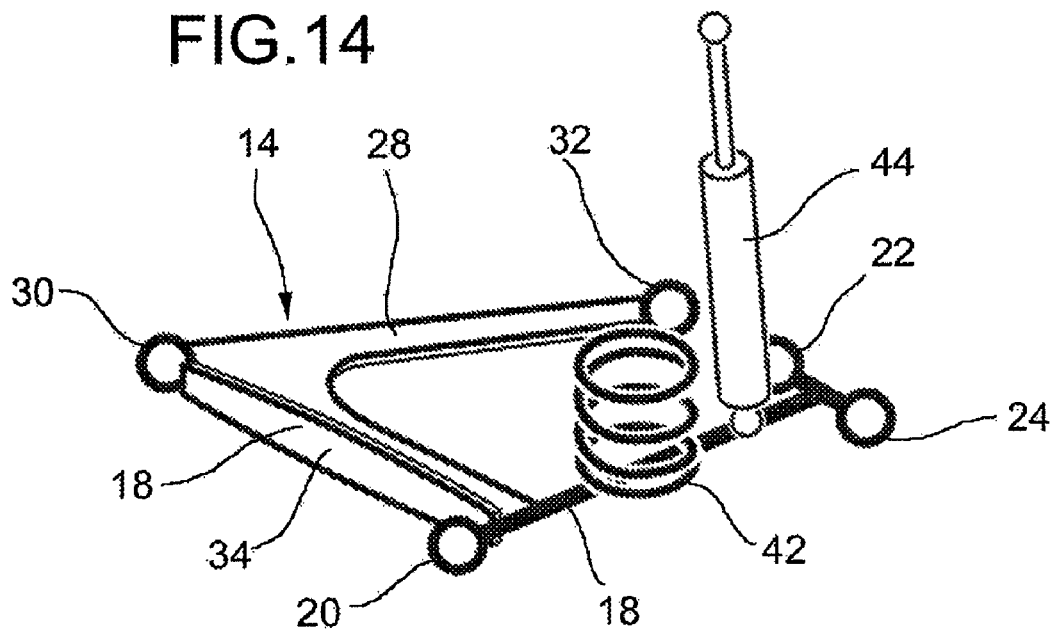
Figure 15:
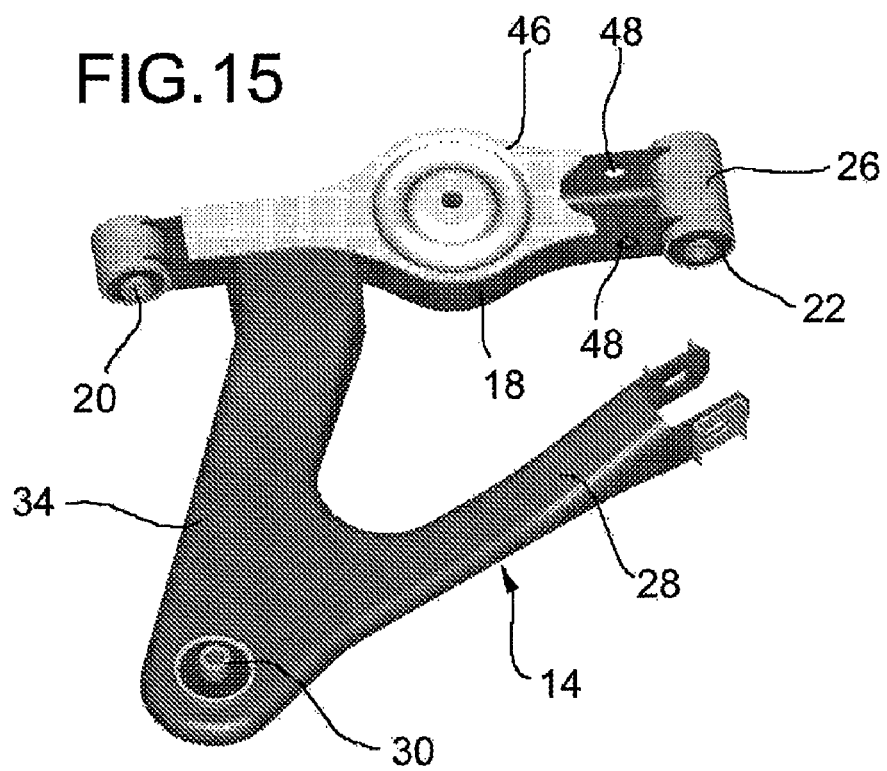

FIG. 3 schematically illustrates the forces acting on the wheel-carrier of a motor vehicle wheel and the two ESA axes defining the elastic behaviour of the suspension of FIG. 1;

FIG. 4 schematically illustrates the five degrees of freedom controlled by the suspension of FIG. 1;

FIG. 5 shows the arrangement of the two ESA axes of the suspension of FIG. 1 in the transverse vertical plane of the vehicle;

FIG. 6 shows the arrangement of the two ESA axes of the suspension of FIG. 1 in the longitudinal vertical plane of the vehicle;

FIG. 7 is a schematic diagram of the suspension of FIG. 1, which specifically shows the points of articulation of the lower arm and of the upper link to the wheel-carrier and to the vehicle body;

FIG. 8 illustrates the behaviour of the lower arm of the suspension of FIG. 1 as a result of a torque around the vertical ESA axis of the suspension;

FIG. 9 illustrates the behaviour of the lower arm of the suspension of FIG. 1 as a result of a torque around the lateral ESA axis of the suspension;

FIGS. 10 and 11 show two possible embodiments of the lower arm of the suspension of FIG. 1, which differ from each other in the cross-sections of the various portions of the arm;

FIGS. 12 and 13 show two further possible embodiments of the lower arm of the suspension of FIG. 1, which are both obtained by stamping and welding and differ from each other in the cross-sections of the various portions of the arm;

FIG. 14 schematically shows a lower suspension arm according to the invention, in combination with a spring and a shock-absorber; and FIG. 15 shows a variant of construction of a lower suspension arm according to the invention, provided with points of attachment and/or support for a spring and a shock-absorber.

In the description and the claims which follow, terms such as "longitudinal" and "transverse", "inner" and "outer", "front" and "rear", "horizontal" and "vertical", "upper" and "lower" are to be intended as referred to the mounted condition on the vehicle. Moreover, according to the rule usually adopted in the automotive field, the longitudinal direction, the transverse direction and the vertical direction of the vehicle will be indicated x, y and z, respectively. Furthermore, the term "vehicle body" is to be intended, both in the description and in the attached claims, as referred to any mounting structure which forms part of the vehicle frame or is made as an auxiliary structure attached to the vehicle frame.

With reference to FIG. 1, a motor vehicle independent suspension according to the invention, adapted to connect a wheel-carrier 10 of a wheel 12 (a rear wheel, in the illustrated example, although the suspension is clearly applicable also to a front wheel) of the motor vehicle to the body (not illustrated) of the motor vehicle, comprises a lower arm 14 and a upper camber control link 16. Both the lower arm 14 and the upper link 16 are oriented transversely and are articulated at their transversely outer ends to the wheel-carrier 10 and at their transversely inner ends to the vehicle body. The points of articulation of the lower arm 14 to the wheel-carrier 10 and to the vehicle body, as well as the points of articulation of the upper link 16, are located in a substantially horizontal plane.

Figure 2:
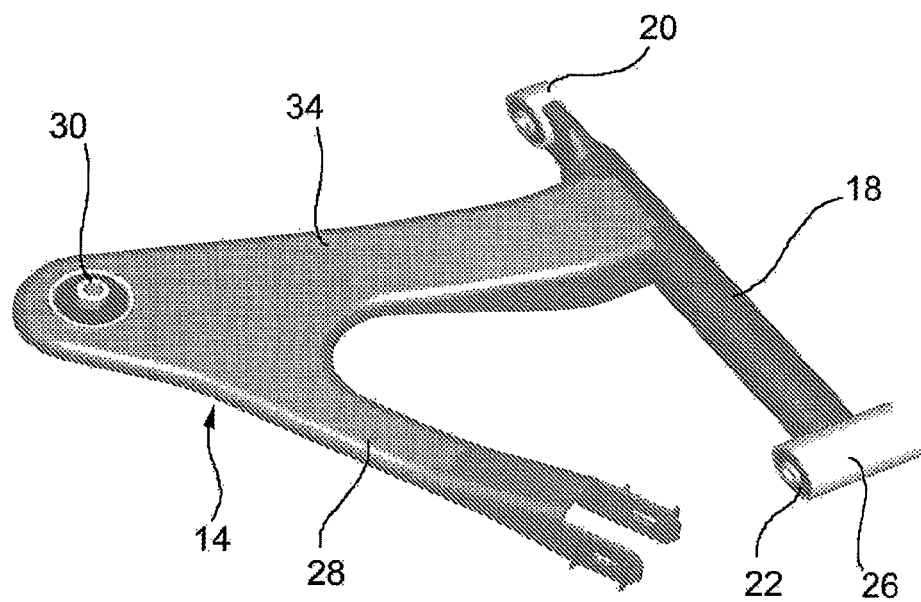
FIG. 2 is a perspective view of the lower arm of the suspension of FIG. 1.

The lower arm 14, of which a preferred embodiment according to the invention is illustrated in FIG. 2, is arranged to control four degrees of freedom of the wheel-carrier 10, as does a conventional rigid "H" arm. In this connection, it is to be taken into account that the expressions "controlling a degree of freedom" and "removing a degree of freedom" are not to be intended in the literary meaning of avoiding a displacement in the direction in question or a rotation around the direction in question, but in the broader sense of allowing a displacement or a rotation significantly smaller than the displacements or rotations allowed in the other directions. However, unlike a conventional rigid "H" arm, the suspension arm 14 according to the invention exhibits an intrinsic flexibility, which is basically due to its geometry and makes it possible to project the centres of stiffness of the arm outside the physical envelope thereof, something which a rigid "H" arm can do to a limited extent and only with the use of special and expensive bushes.

The lower arm 14 include a transverse link 18 stiff in torsion, which is connected at its transversely inner end to the vehicle body through a bush 20 and at its transversely outer end to the wheel-carrier 10 through a pair of bushes 22 and 24. The axes both of the inner bush 20 and of the two outer bushes 22 and 24 are orientated substantially parallel to the longitudinal direction of the vehicle (X direction). The two outer bushes 22 and 24 are fitted in a cylindrical tube 26 secured, for instance by welding, to the outer end of the transverse link 18.

The lower arm 14 further includes a substantially straight connecting element 28, which extends at an angle relative to the transverse direction of the vehicle so as to converge outwardly towards the transverse link 18 and is articulated at its ends to the vehicle body through a vertical-axis bush 30 and to the wheel-carrier 10 through a horizontal-axis bush 32. The lower arm 14 also includes a substantially straight interconnecting element 34, which extends in an approximately longitudinal direction and is securely connected to the transverse link 18 and to the connecting element 28 at the transversely inner ends thereof. Preferably, the two elements 28 and 34 are integrally formed as a single V-shaped sheet-metal piece. In this case, the vertical-axis bush 30 is located at the vertex of the V.

As will be better explained in the following part of the description, the connecting element 28 has a cross-section such that it exhibits a high bending stiffness in the horizontal plane, but a low bending stiffness in a direction perpendicular to that plane, whereas the interconnecting element 34 has a cross-section such that it exhibits a high bending stiffness both in the horizontal plane and in a vertical plane, but a low torsional stiffness, whereby the vertical stiffness of the lower arm 14 at the bush 32 is reduced.

In order to define the elastic characteristics of the suspension, the EEM (Equivalent Elastic Mechanism) technique developed by the Applicant and disclosed in SAE Paper 2005-01-1719 will be used.

With reference to FIGS. 3 to 6, the stiffness characteristics of the transverse link 18 and of the connecting element 28 of the lower arm 14 are selected in such a manner that the suspension has a first, substantially vertical elastic axis ESAz, arranged outwardly of and behind the wheel, and a second, substantially horizontal and transverse elastic axis ESAy, located at a height between the wheel centre and the contact patch with the ground.

FIG. 3, as well as FIGS. 5 and 6, shows the arrangement of the two elastic axes ESAz and ESAy, along with the direction and the point of application of each of the forces acting on the wheel 10, that is to say, the impact force IF, the braking force BF and the cornering force CF. Arrow F indicates the running direction of the vehicle, whereas dash-dot line M indicates the middle plane of the vehicle.

The two elastic axes ESAy and ESAz are always perpendicular to each other, for the same reason why the principal axes of stiffness of an elastic system are. The orientation of the two elastic axes in the front vertical plane (YZ plane) is defined by the inclination of the lower arm 14 in that plane. The arm 14 may be, in fact, not arranged in the horizontal plane, but inclined relative thereto. The inclination of the ESAz axis in the lateral vertical plane (XZ plane) is defined by the intersection between the axes of the transverse link 18 and of the connecting element 28 of the lower arm 14 and by the longitudinal position of the upper camber control link 16.

By reasoning in terms of degrees of freedom, two of the three translational degrees of freedom of the wheel-carrier 10 are controlled by the lower arm 14 and one by the upper link 16. With reference to FIG. 4, the two translational degrees of freedom DOF1 and DOF2 controlled by the lower arm 14 correspond to the translation along the axis of the transverse link 18 and to the translation along the axis of the connecting element 28, while the third translational degree of freedom DOF3 corresponds to the translation along the axis passing through the points of articulation of the upper camber control link 16. The remaining two rotational degrees of freedom DOF4 and DOF5 of the wheel-carrier 10 correspond to the rotations around the two elastic axes ESAz and ESAy. The suspension is not conceived to remove completely these two degrees of freedom, that is to offer an essentially infinite rotational stiffness around the two above-mentioned axes, but rather to offer a certain rotational stiffness properly calculated depending on the requirements imposed on the elasto-kinematic behaviour of the suspension.

As far as the rotational degree of freedom DOF4 around the approximately vertical axis ESAz is concerned, it is controlled by the bending stiffness characteristics of the lower arm 14 in the horizontal plane. If the transverse link 18 and the connecting element 28 were simply two connecting rods not connected to each other, each of them would only be able to control one translational degree of freedom along its own axis. The provision of a non-rigid but compliant connection between the transverse link 18 and the connecting element 28, which connection is represented by the interconnecting element 34, makes it possible for the lower arm 14 to be able not only to define a centre of rotation for the wheel-carrier 10, but also to impose a rotational stiffness around this centre. The higher is the rotational stiffness, the more the actual elastic centre of rotation of the wheel-carrier tends to move from its ideal geometric position (point of intersection of the axes of the transverse link 18 and of the connecting element 28) to the arm itself. The rotational stiffness around the axis ESAy, that is the stiffness associated to the rotational degree of freedom DOF4, is therefore depending on the combined effect of the bending stiffnesses of the transverse link 18 and of the arm elements 28 and 34 in the horizontal plane.

As far as the rotational stiffness around the approximately transverse axis ESAy is concerned, it is responsible for the majority of the longitudinal compliance of the suspension at the wheel centre. Since one of the requirements of the suspension is to exhibit an increasing stiffness at the extremes of the longitudinal wheel travel, the rotational stiffness of the suspension around the axis ESAy will have to increase at the extremes of the longitudinal wheel travel. It is therefore usually preferable that this rotational stiffness is not determined or affected by the structural flexibility of the control arm (the lower arm, in the pre-sent invention), as this latter is substantially constant up to the onset of plastic deformations.

The easiest way to obtain a non-linear stiffness characteristic is the use of rubber bushes. Therefore, in order to prevent the lower arm 14 from bending as a whole, one of the outer points of articulation of the arm is split into a pair of bushes, that is to say, the bushes 22 and 24 by means of which the transverse link 18 is articulated to the wheel-carrier 10. The transverse link 18 is thus able to react to a torque acting around a transverse axis (axis ESAy). To this end, the transverse link 18 is preferably orientated along an essentially transverse direction, and not inclined with respect to this latter in the plan view.

The torque acting around the axis ESAy is then transmitted to the vehicle body by the torsional reaction of the only transverse link 18, which must therefore be stiff in torsion, as already mentioned above. Otherwise, it would not be possible to achieve a significant degree of non-linearity in the rotational stiffness due to the excessive contribution provided by the structural flexibility of the link. In order to transmit the torsional reaction of the transverse link 18 to the vehicle body, the interconnecting element 34 is used, which therefore will be stiff in bending not only in the horizontal plane but also in a vertical plane to contribute to the rotational stiffness around the approximately vertical axis ESAz.

In order to ensure that the torques acting around the axis ESAy are reacted only by the transverse link 18 stiff in torsion, thereby achieving the desired non-linear stiffness characteristic of the arm, it is necessary to make sure that the connecting element 28 has no contribution whatsoever to the reaction of these torques and that the vertical stiffness of the lower arm 14 at the point of attachment of the connecting element 28 to the wheel-carrier 10 is thus very low. To this end, the connecting element 28 is made so as to exhibit a low bending stiffness in a vertical plane. Since the connecting element 28 must exhibit at the same time a high bending stiffness in the horizontal plane, as explained above in connection with the rotational behaviour of the arm around the approximately vertical elastic axis ESAz, the connecting element 28 has preferably a blade-like cross-section.

The vertical stiffness of the lower arm 14 at the point of attachment of the connecting element 28 to the wheel-carrier 10, that is, at the bush 32, is actually given by the sum of the bending stiffnesses of the link 18 and of the connecting element 28 and of the torsional stiffness of the interconnecting element 34, as these stiffnesses act in series. It is therefore possible to achieve the same object to reduce the vertical stiffness at the bush 30 with different combinations of cross-sections of the different portions of the lower arm 14. Two examples of different combinations of the cross-sections of the connecting element 28 and of the interconnecting element 34 are given in FIGS. 10 and 11.

In FIG. 10 the connecting element 28 has a blade-like shape lying in the horizontal plane, so as to be stiff in bending in the horizontal plane but compliant both in torsion and in bending in a vertical plane, whereas the interconnecting element 34 has a cross-section in the shape of a T rotated ninety degrees, so as to be stiff in bending both in the horizontal plane and in a vertical plane, but compliant in torsion.

In FIG. 11, on the other hand, both the connecting element 28 and the interconnecting element 34 have a C-shaped cross-section, so as to be stiff in bending both in the horizontal plane and in a vertical plane, but compliant in torsion.

The fact that different combinations of cross-sections can be provided to obtain the same overall stiffness characteristics of the lower arm means that there exists a wide freedom of choice as how to make the arm itself. Since the connecting element 28 and the interconnecting element 34 may have open cross-sections, these two elements are conveniently produced as stamped pieces, either as a single piece (as in the example of construction shown in FIG. 2) or as two separate pieces joined to each other by welding. The transverse link 18 may also be obtained by stamping and welding.

Two examples of construction of a lower arm obtained by stamping and welding are shown in FIGS. 12 and 13.

In both the examples of construction, the transverse link 18 is made as a tube having a rectangular open cross-section, at the ends of which the cylindrical seat 26 adapted to receive the pair of bushes for connection to the wheel-carrier and a cylindrical seat 36 adapted to receive the bush for connection to the vehicle body are secured by welding.

In the arm of FIG. 12, the connecting element 28 has a C-shaped cross-section with a vertical blade-like portion, at the ends of which there are provided horizontal-axis cylindrical seats 38 and 40 for the bushes for connection to the wheel-carrier and to the vehicle body, respectively, and with a pair of upper and lower tabs which extend from the opposite edges of the vertical blade-like portion and have an increasing width towards the interconnecting element 34. The interconnecting element 34 has a substantially constant C-shaped cross-section. The connecting element 28 and the interconnecting element 34 are made as separate pieces, both advantageously obtained by stamping, and are joined to each other by welding.

In the arm of FIG. 13, the connecting element 28 has a horizontal blade-like configuration, whereas the interconnecting element 34 has a L-shaped cross-section. In this case, the two elements 28 and 34 form a single V-shaped piece, at the vertex of which a cylindrical seat 40 is provided for the bush for connection to the vehicle body.

FIG. 14 schematically shows how the lower arm 14 can be used for attachment and/or mounting of a spring 42 and of a shock-absorber 44 of the suspension. Advantageously, both the spring 42 and the shock-absorber 44 are mounted on the torsionally stiff part of the arm, that is, on the transverse link 18. In this connection, as shown in FIG. 15, the transverse link 18 is provided with a support element 46 for the spring 42 and has a pair of aligned holes 48 for insertion of a pin (not shown) for attachment of the lower end of the shock-absorber 44.

In order to keep the ability to project the centre of stiffness of the lower arm 14 outside the physical envelope thereof, the four points of attachment of the arm 14 to the wheel-carrier 10 and to the vehicle body must have each a high stiffness along the axis of the respective connecting element (link 18 or element 34). This stiffness requirement involves that all the bushes tend to be stiff, and therefore simple and durable, with beneficial effects in terms of cost of the suspension.

It is however preferable that one of the two paired bushes 22 and 24 through which the transverse link 18 is connected to the wheel-carrier 10 is significantly softer than the other bush. The combination of a stiff bush and of a soft bush suitably spaced from each other does not prevent to maintain the required stiffness along the axis of the transverse link 18 (the two bushes are in fact arranged in parallel, and therefore the effect of the stiffer bush is not diminished by the presence of the softer bush) and further allows to concentrate in a single bush (the soft bush) the control of the rotational stiffness around the elastic axis ESAy and hence of the longitudinal compliance at the wheel centre. This results to be particularly useful when it comes to tuning the suspension during the prototype stage: in fact, if one of the two bushes is significantly softer than the other bush, then changes made to the longitudinal compliance at the wheel centre, both in the linear region and in the non-linear region, will have a minimal effect on the other elasto-kinematic characteristics of the suspension.

The main advantages of the invention can be identified in the following points.

a) The incorporation of all the compliance characteristics of the suspension in the physical shape of the lower control arm results in a suspension architecture which is extremely simple and therefore less expensive than complicated multi-link suspensions which offer comparable elasto-kinematic performances.

b) The suspension has a smaller number of parts and a lower weight.

c) The suspension has independent load paths and hence a greater decoupling between the elasto-kinematic behaviours in the longitudinal direction and in the transverse direction than the prior art discussed in the introductory part of the description.

Naturally, the principle of the invention remaining unchanged, the embodiments and details of construction may vary widely with respect to those described and illustrated purely by way of a non-limiting example.

For example, the torsionally stiff part of the lower arm 14, namely the transverse link 18, can be arranged either frontwards or rearwards. Accordingly, also the pair of bushes 22 and 24 for connection to the wheel-carrier can be arranged either in the frontward or in the rearward part of the arm.

Moreover, the cross-section of the torsionally stiff part of the lower arm 14 (link 18) may have different shapes and may also be open, even though a closed shape is preferable. This part may be conveniently obtained by welded connection of two stamped pieces or from a pre-formed tube. Alternatively, this part may be formed as a single piece with the interconnecting element 34 or both with the interconnecting element 34 and with the connecting element 28. In both these cases, the part 18 might be conveniently produced as a stamped piece of open cross-section and then finished by addition of a closing piece to form a closed cross-section. This closing piece can be constituted for example by the piece 46 (FIG. 15) used as mounting for the spring 42.

The cross-section of the torsionally stiff part of the lower arm 14, that is to say, of the connecting element 28, as well as that of the interconnecting element 34, need not fulfil particular requirements and can therefore take different shapes, provided the sum of their compliances results in a very low vertical stiffness at the point of attachment of the connecting element 28 to the wheel-carrier.

Also the orientation of the bushes is not subject to particular constraints, even though the orientation proposed in the embodiment of FIGS. 1 and 2, where each bush is arranged with its axis perpendicular to the axis of the element to which it is secured, apart from one of the bushes for connection to the vehicle body, that is to say, the vertical-axis bush 30 mounted on the torsionally compliant part of the arm, is preferable.

The axes of the torsionally stiff part (transverse link 18) and of the torsionally compliant part (connecting element 28) of the lower arm must not necessarily lie in the same plane. They are only required to converge towards the outside of the vehicle.

Even though it is preferable that one of the two paired bushes for connection to the wheel-carrier is significantly less stiff than the other in order to control the longitudinal compliance of the suspension at the wheel centre, this is not essential for the invention.

Finally, the essentially transverse orientation of the link 18, which constitutes the torsionally stiff part of the lower arm 14, is preferable but not necessary.

The invention claimed is:

1. Lower control arm (14) for a motor vehicle independent suspension, which connects a wheel-carrier (10) of a vehicle wheel (12) to a vehicle body so as to control four degrees of freedom (DOF1, DOF2, DOF4, DOF5) of the wheel-carrier (10), comprising a first elongated transverse connecting element (18), articulated at its transversely outer end (22, 24) to the wheel-carrier (10) and at its transversely inner end (20) to the vehicle body, a second elongated transverse connecting element (28), articulated at its transversely outer end (32) to the wheel-carrier (10) and at its transversely inner end (30) to the vehicle body, and a longitudinal interconnecting element (34) which connects said first and second connecting elements (18, 28) to each other at transversely inner portions thereof, wherein said first and second connecting elements (18, 28) are orientated so that their axes converge towards the outside of the vehicle;

characterized in that the first connecting element (18) is substantially stiff in torsion and is provided at its transversely outer end with a pair of bushes (22, 24) for connection to the wheel-carrier (10), and in that the second connecting element (28) and the interconnecting element (34) have cross-sections such that the vertical stiffness of the arm (14) at the point of articulation of the second connecting element (28) to the wheel-carrier (10) is negligible with respect to the vertical stiffness at the point of articulation of the first connecting element (18) to the wheel-carrier (10), whereby torques acting on the wheel-carrier (10) around a transverse axis (ESAy) are reacted only by first connecting element (18).

2. Suspension arm according to claim 1, wherein the axes of the first and second connecting elements (18, 28) are arranged in an approximately horizontal plane.

3. Suspension arm according to claim 1, wherein the axis of the first connecting element (18) is substantially orientated in the transverse direction (Y) of the vehicle.

4. Suspension arm according to claim 1, wherein the first torsionally stiff connecting element (18) is arranged behind the second connecting element (28).

5. Suspension arm according to claim 1, wherein the first connecting element (18) has a closed cross-section.

6. Suspension arm according to claim 5, wherein the first connecting element (18) is made up of two stamped pieces joined to each other by welding.

7. Suspension arm according to claim 5, wherein the first connecting element (18) is obtained from a pre-formed tube.

8. Suspension arm according to claim 1, wherein the second connecting element (28) is stiff in bending in the horizontal plane, but compliant in bending in a vertical plane.

9. Suspension arm according to claim 8, wherein the second connecting element (18) has an open cross-section.

10. Suspension arm according to claim 9, wherein the second connecting element (18) has a C-shaped cross-section.

11. Suspension arm according to claim 8, wherein the second connecting element (18) is also compliant in bending in a vertical plane.

12. Suspension arm according to claim 11, wherein the second connecting element (18) has a blade-like shape.

13. Suspension arm according to claim 1, wherein the interconnecting element (34) is stiff in bending both in the horizontal plane and in a vertical plane, but compliant in torsion.

14. Suspension arm according to claim 13, wherein the interconnecting element (34) has an open cross-section.

15. Suspension arm according to claim 14, wherein the interconnecting element (34) has a C-shaped cross-section.

16. Suspension arm according to claim 1, wherein the second connecting element (28) and the interconnecting element (34) are made as a single piece.

17. Suspension arm according to claim 1, wherein the second connecting element (28) and the interconnecting element (34) are made each as a stamped piece and are securely connected to each other.

18. Suspension arm according to claim 1, wherein the first connecting element (18) and the interconnecting element (34) are made as a single piece.

19. Suspension arm according to claim 16, wherein the first connecting element (18), the second connecting element (28)

and the interconnecting element (34) are made as a single stamped piece of open cross-section.

20. Suspension arm according to claim 19, further comprising a closing piece secured to the first connecting element (18) to form a part having a closed cross-section.

21. Suspension arm according to claim 1, provided with mounting points (46) for a spring (42) and with attachment points (48) for a shock-absorber (44).

22. Suspension arm according to claim 20, wherein said closing piece is arranged to provide a mounting surface (46) for the spring (42).

23. Suspension arm according to claim 1, comprising a first bush seat (26) for the aforesaid pair of bushes (22, 24) intended to connect the first connecting element (18) to the wheel-carrier (10), a second bush seat (36) for a bush (20) intended to connect the first connecting element (18) to the vehicle body, a third bush seat (38) for a bush (32) intended to connect the second connecting element (28) to the wheelcarrier (10) and a fourth bush seat (40) for a bush (30) intended to connect the second connecting element (28) to the vehicle body.

24. Suspension arm according to claim 23, wherein said first, second and third bush seats (26, 36, 38) have horizontal axes and said fourth bush seat (40) has a vertical axis.

25. Motor vehicle independent suspension comprising a lower control arm (14) according to claim 1 and an upper camber control link (16).

* * * * *